US012035653B2

(12) United States Patent
Graham et al.

(10) Patent No.: US 12,035,653 B2
(45) Date of Patent: Jul. 16, 2024

(54) WALK-BEHIND MOWER WITH WIDE ANGLE ILLUMINATION

(71) Applicant: MILWAUKEE ELECTRIC TOOL CORPORATION, Brookfield, WI (US)

(72) Inventors: Tyler L. Graham, Milwaukee, WI (US); Anthony J. Buxton, Wauwatosa, WI (US); Benjamin F. Shaske, Pewaukee, WI (US); Adam N. Carter, Milwaukee, WI (US); Shane McCue, Greenfield, WI (US); John L. Whealon, West Bend, WI (US); Christopher Shawn Bullington, Milwaukee, WI (US); Zachary Self, Nashotah, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

(21) Appl. No.: 18/315,757

(22) Filed: May 11, 2023

(65) Prior Publication Data

US 2023/0276731 A1 Sep. 7, 2023

Related U.S. Application Data

(63) Continuation of application No. 17/466,078, filed on Sep. 3, 2021, now Pat. No. 11,684,009.

(Continued)

(51) Int. Cl.
*A01D 34/00* (2006.01)
*F21S 9/02* (2006.01)
(Continued)

(52) U.S. Cl.
CPC .............. *A01D 34/001* (2013.01); *F21S 9/02* (2013.01); *A01D 2101/00* (2013.01); *F21Y 2115/10* (2016.08)

(58) Field of Classification Search
CPC .............. A01D 34/001; A01D 2101/00; B60Q 2800/20; B60Q 1/24; F21V 33/00
See application file for complete search history.

(56) References Cited

U.S. PATENT DOCUMENTS 5,442,527 A * 8/1995 Wichelt ................... B60Q 1/24
315/83
5,563,774 A 10/1996 Welsch
(Continued)

FOREIGN PATENT DOCUMENTS

CN 102422750 B 7/2013
CN 104823595 A 8/2015
(Continued)

OTHER PUBLICATIONS

International Search Report and Written Opinion for Application No. PCT/US2021/048987 dated Dec. 17, 2021 (10 pages).

*Primary Examiner* — Tracie Y Green
*Assistant Examiner* — Michael Chiang
(74) *Attorney, Agent, or Firm* — Michael Best & Friedrich LLP

(57) ABSTRACT

A walk-behind mower has a mower deck, a plurality of wheels, a head, and a plurality of light sources. The wheels are rotatably coupled to the mower deck. The wheels move the walk-behind mower over a support surface in a forward direction and a rearward direction. The head is coupled to the mower deck. The head can store at least one battery pack. The light sources are coupled to at least one of the mower deck and the head. The light sources project light through a continuous illumination angle about the walk-behind mower. The illumination angle extends along an arc from the forward direction toward the rearward direction and is at least 90 degrees.

20 Claims, 14 Drawing Sheets

Related U.S. Application Data

(60) Provisional application No. 63/074,554, filed on Sep. 4, 2020.

(51) Int. Cl.
  *A01D 101/00* (2006.01)
  *F21Y 115/10* (2016.01)

(56) References Cited

U.S. PATENT DOCUMENTS

| | | |
|---|---|---|
| 8,646,952 B2 | 2/2014 | Walden et al. |
| 9,169,609 B2 | 10/2015 | Lambert et al. |
| 9,939,135 B2 | 4/2018 | Varhola |
| 10,107,484 B2 | 10/2018 | Moyers |
| 10,180,243 B1 | 1/2019 | Robertson |
| 10,907,802 B1 * | 2/2021 | Pattison ............... B60S 1/603 |
| 11,684,009 B2 * | 6/2023 | Graham ............. A01D 34/001 56/229 |
| 2016/0116145 A1 | 4/2016 | Moyers |
| 2016/0305636 A1 | 10/2016 | Varhola |
| 2018/0347803 A1 | 12/2018 | Dimsey et al. |
| 2019/0341826 A1 * | 11/2019 | Zeiler ................ H02K 5/04 |
| 2019/0359116 A1 * | 11/2019 | Elgh .................. B60Q 1/04 |
| 2020/0031270 A1 * | 1/2020 | Beschorn ........... F21V 23/0442 |
| 2021/0112711 A1 * | 4/2021 | Nie .................. A01D 34/74 |

FOREIGN PATENT DOCUMENTS

| | | |
|---|---|---|
| CN | 204560241 U | 8/2015 |
| CN | 106717470 A | 5/2017 |
| CN | 107295851 A | 10/2017 |
| CN | 206932652 U | 1/2018 |
| CN | 108916838 A | 11/2018 |
| CN | 208387304 U | 1/2019 |
| CN | 208572762 U | 3/2019 |
| CN | 208703891 U | 4/2019 |
| DE | 202009007877 U1 | 10/2010 |
| JP | 2011024518 A | 2/2011 |

* cited by examiner

WALK-BEHIND MOWER WITH WIDE ANGLE ILLUMINATION

CROSS REFERENCE TO RELATED APPLICATIONS

This filing is a continuation application of U.S. Non-Prov. application Ser. No. 17/466,078, filed Sep. 3, 2021, which claims the benefit of U.S. Prov. App. No. 63/074,554, filed Sep. 4, 2020, each of which is incorporated by reference in its entirety.

FIELD OF DISCLOSURE

The present disclosure relates generally to the field of mowers and more particularly to a battery-powered walk-behind mower with wide-angle illumination.

BACKGROUND

Maintaining a lawn is a responsibility shared by many homeowners, renters, landscapers, and others. Nevertheless, because of the common demands of life, many people struggle to find enough time to properly maintain a lawn, especially during daylight hours. Many walk-behind lawn-mowers from the past are inadequately illuminated, resulting in unmaintained lawns that fall short of their natural potential because lawnmower operators are unable or unwilling to mow at night or during other low-light conditions. Past efforts at illuminating walk-behind mowers have failed to illuminate the area around the walk-behind lawnmower at a sufficiently wide angle, limiting the ability of the lawn-mower operator to see the grass that has already been mowed and the grass yet to be mowed.

Accordingly, there is a need for improved techniques for illuminating the area surrounding walk-behind lawnmowers. A benefit of such illumination is that lawnmower operators will be able to see the grass surrounding the mower. This will enable efficient mowing by minimizing the leaving of unmowed strips of grass, as well as by minimizing the width of unnecessary overlaps between passes of the lawnmower. Therefore, the presently disclosed embodiments of a wide-angle illumination system save the lawnmower operator both time and money by saving fuel or power (for electric lawnmowers). A well-illuminated lawnmower is also safer to operate than a poorly illuminated lawnmower.

In addition, other desirable features and characteristics of the present disclosure will become apparent from the subsequent detailed description and embodiments, taken in conjunction with the accompanying figures and the foregoing technical field and background.

The Background section of this document is provided to place embodiments of the present disclosure in technological and operational context and to assist those of skill in the art in understanding their scope and utility. Unless explicitly identified as such, no statement herein is admitted to be prior art merely by its inclusion in the Background section.

SUMMARY

The following presents a simplified summary of the disclosure in order to provide a basic understanding to those of ordinary skill in the art. This summary is not an extensive overview of the disclosure and is not intended to identify key/critical elements of embodiments of the disclosure or to delineate the scope of the disclosure. The sole purpose of this summary is to present some concepts disclosed herein in a simplified form as a prelude to the more detailed description that is presented later.

Briefly described, one aspect of the disclosure is a walk-behind mower with a mower deck, a plurality of wheels, a head, and a plurality of light sources. The wheels are rotatably coupled to the mower deck. The wheels move the walk-behind mower over a support surface in a forward direction and a rearward direction. The head is coupled to the mower deck. The head can store at least one battery pack. The light sources are coupled to at least one of the mower deck and the head. The light sources project light through a continuous illumination angle about the walk-behind mower. The illumination angle extends along an arc from the forward direction toward the rearward direction and is at least 90 degrees.

Another aspect of the disclosure is a walk-behind mower with a mower deck, a plurality of wheels, a handle, and a plurality of light sources. The wheels are rotatably coupled to the mower deck. The wheels include a pair of rear wheels that rotate about a rear axis. The handle is located rearward of the rear axis. The light sources are located forward of the rear axis. Each respective wheel has a corresponding light source nearer to the respective wheel than to any other wheel on the walk-behind mower.

Another aspect of the disclosure is a walk-behind mower with a mower deck, a plurality of wheels, and a plurality of light sources. The mower deck has at least one sidewall. The wheels are rotatably coupled to the mower deck. The light sources are coupled to the mower deck. At least one light source is coupled to at least one sidewall of the mower deck.

It is to be understood that the foregoing general description and the following detailed description of the embodiments or arrangements are exemplary and explanatory and are intended only to provide further explanation of the embodiments as claimed. Other aspects of the invention will become apparent by consideration of the detailed description and accompanying drawings.

BRIEF DESCRIPTION OF THE DRAWINGS

Features and aspects of the disclosure will become apparent by consideration of the following detailed description and accompanying drawings. However, this disclosure should not be construed as limited to the embodiments set forth herein. Rather, these embodiments are provided so that this disclosure will be thorough and complete and will fully convey the scope of the disclosure to those skilled in the art. It will be readily apparent to one of ordinary skill in the art that the present disclosure may be practiced without limitation to any specific details set forth herein. Like numbers refer to like elements throughout.

DETAILED DESCRIPTION

Figure 1:
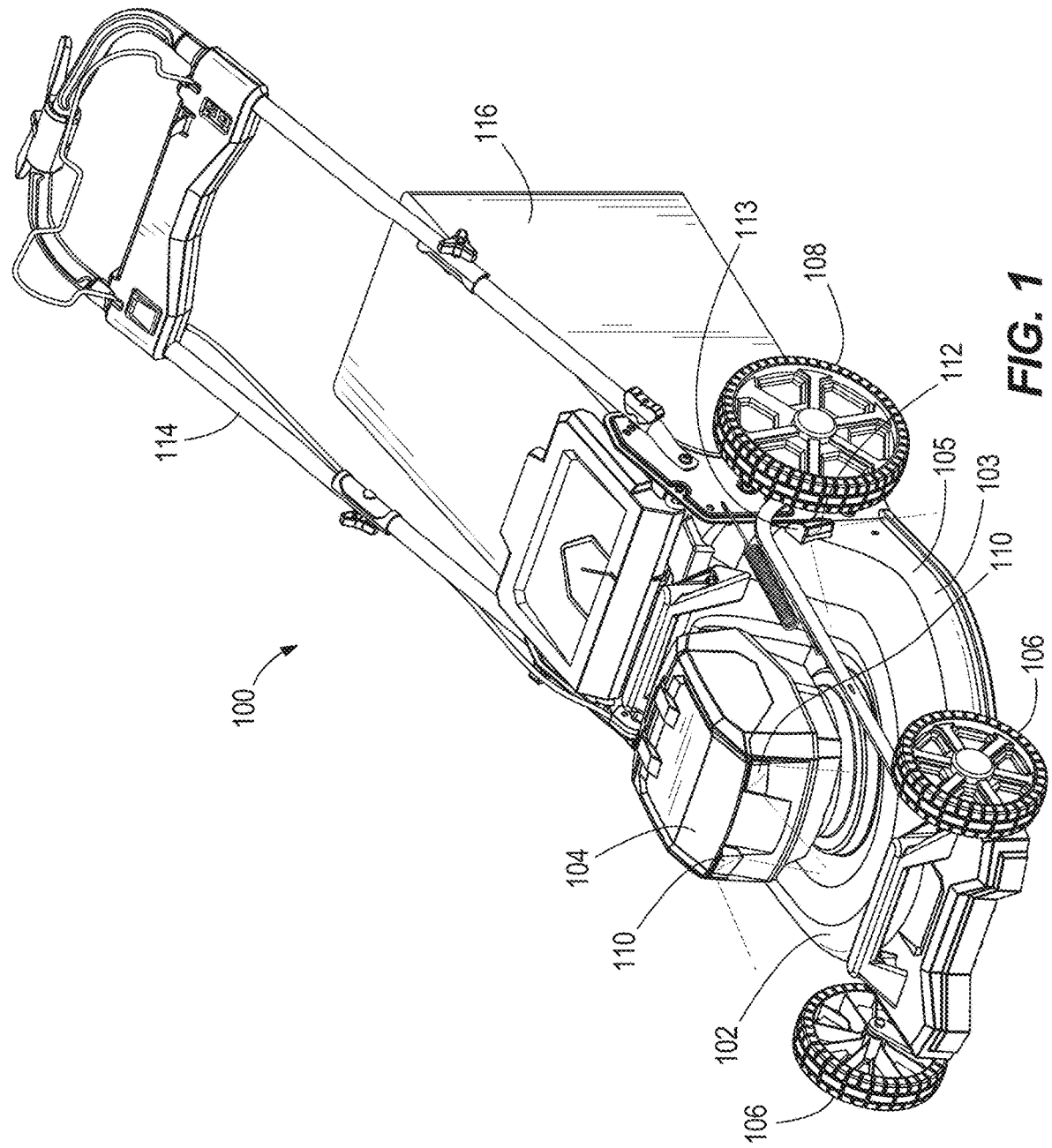
FIG. 1 is a perspective view of a walk-behind mower, according to embodiments disclosed herein.
Figure 2:
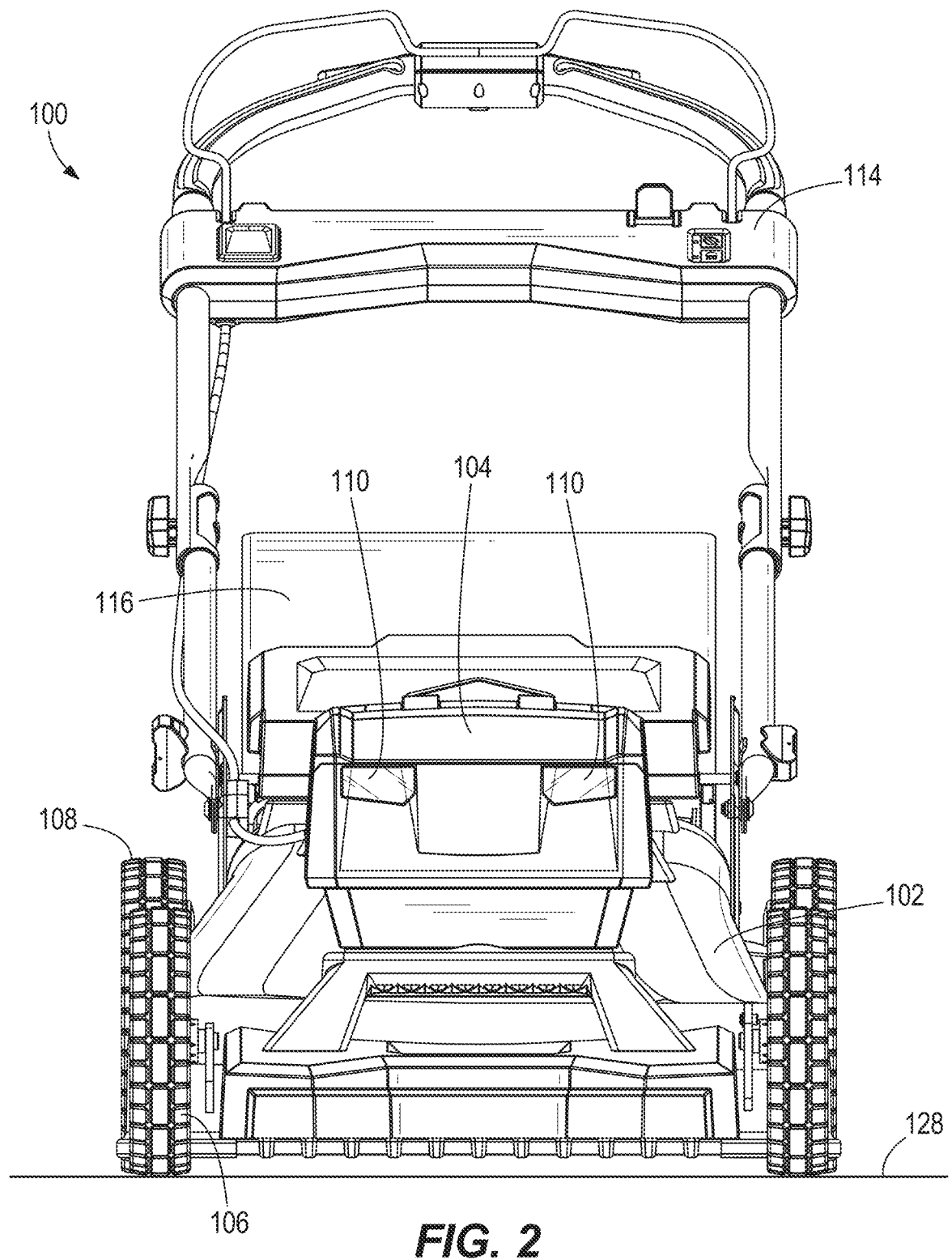
FIG. 2 is a front elevation view of the walk-behind mower of FIG. 1.

Before any embodiments of the disclosure are explained in detail, it is to be understood that the disclosure is not limited in its application to the details of construction and the arrangement of components set forth in the following description or illustrated in the drawings. The disclosure is capable of other embodiments and of being practiced or of being carried out in various ways. Also, it is to be understood that the phraseology and terminology used herein is for the purpose of description and should not be regarded as limiting.

With reference to FIG. 1, a first embodiment of a walk-behind mower 100 is shown. The walk-behind mower 100 includes a mower deck 102, a head 104, a plurality of wheels 106, 108, a plurality of light sources 110, 112, a control bar assembly 114, and a removable collection bag 116.

The mower deck 102 supports one or more rotary cutting blades (not shown) that are rotatably coupled to an underside of the deck. The mower deck 102 also carries an electric motor (not shown) that drives the one or more rotary cutting blades. In the illustrated embodiment, the walk-behind mower 100 may be a self-propelled mower and the electric motor (or one or more additional electric motors) may power the wheels 106, 108. The mower deck 102 also acts as a frame in the illustrated embodiment.

The head 104 is coupled to the mower deck 102 and is disposed on an upper surface of the mower deck 102. The head 104 is configured to at least partially surround the motor. The head 104 may be further configured to carry one or more battery packs (such as the battery packs 607 of FIG. 14) that provides electricity to operate various components and associated electronic circuits of the walk-behind mower 100, including the rotary cutting blades.

The mower deck 102 is supported on the ground or support surface 128 by the plurality of wheels 106, 108. The plurality of wheels 106, 108 are rotatably coupled to the mower deck 102 for rolling on the ground. In the illustrated embodiment, the walk-behind mower 100 includes two front wheels 106 and two rear wheels 108. The front wheels 106 rotate about a front rotational axis 118 positioned proximate the front end of the mower deck 102. The rear wheels 108 rotate about a rear rotational axis 120 positioned proximate the rear end of the mower deck 102. The wheels 106, 108 allow the walk-behind mower 100 to move in a forward direction 122 when the user pushes against the control bar assembly 114 and to move in an opposite rearward direction 124 when the user pulls on the control bar assembly 114 or if the mower is self-propelled in either direction. As used herein, the terms "front" and "forward" are in a direction parallel to the direction from the rear wheels 108 to the front wheels 106, while the terms "rear" and "rearward" are in a direction parallel to the direction from the front wheels 106 to the rear wheels 108. The terms "right" and "left" are from the perspective of an operator standing behind the mower and facing in a forward direction.

The control bar assembly 114 is attached at the rear end of the mower deck 102 and extends rearwardly and upwardly therefrom. The control bar assembly 114 is held by a user as a handle and includes controls for controlling operation of the walk-behind mower 100, including, for example, a blade start button to engage the rotary cutting blades; a headlight button to operate light sources 110, 112 (described below); an operator presence bail to start and stop the mower; and one or more levers, triggers or paddles to cause the mower to move forward at different speeds.

The walk-behind mower 100 also includes a plurality of light sources 110, 112. In the illustrated embodiment, the walk-behind mower 100 includes a pair of front light sources 110 coupled to the head 104 and a pair of rear light sources 112 coupled to the mower deck 102. The light sources 110, 112 can be any appropriate light source, but the illustrated embodiment utilizes light-emitting diodes (LEDs). As shown best in FIGS. 3 and 4, the front light sources 110 are positioned nearer to the front rotational axis 118 than to the rear rotational axis 120 and the rear light sources 112 are positioned nearer to the rear rotational axis 120 than to the front rotational axis 118. In the illustrated embodiment, the front light sources 110 are positioned rearward from the front rotational axis 118 and the rear light sources 112 are positioned forward of the rear rotational axis 120. In some embodiments, all of the light sources 110, 112 are positioned forward of the rear rotational axis 120. The light sources 110, 112 may be disposed such that each respective wheel 106, 108 of the plurality of wheels has a corresponding light source 110, 112 nearer to the respective wheel 106, 108 than to any other wheel of the plurality of wheels.

In some embodiments, the light sources 110, 112 may be coupled to the mower deck 102 or to the head 104. Further, one or more of the light sources 110, 112 may be configured to be incorporated into the mower deck 102 or the head 104. The light sources 110, 112 could be located at various places around the mower deck 102 or the head 104.

Figure 3:
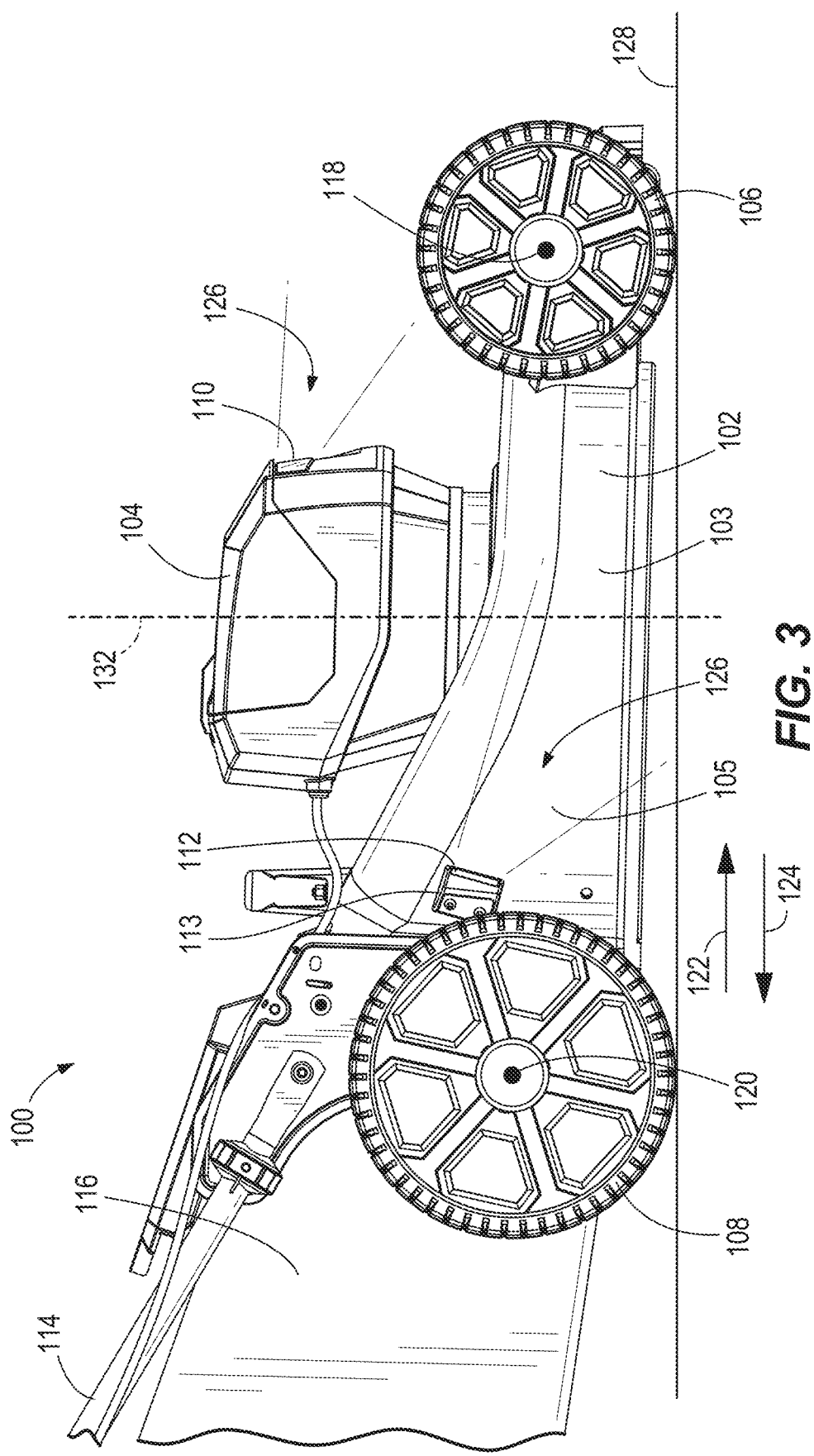
FIG. 3 is a detailed right-side elevation view of the walk-behind mower of FIG. 1.
Figure 4:
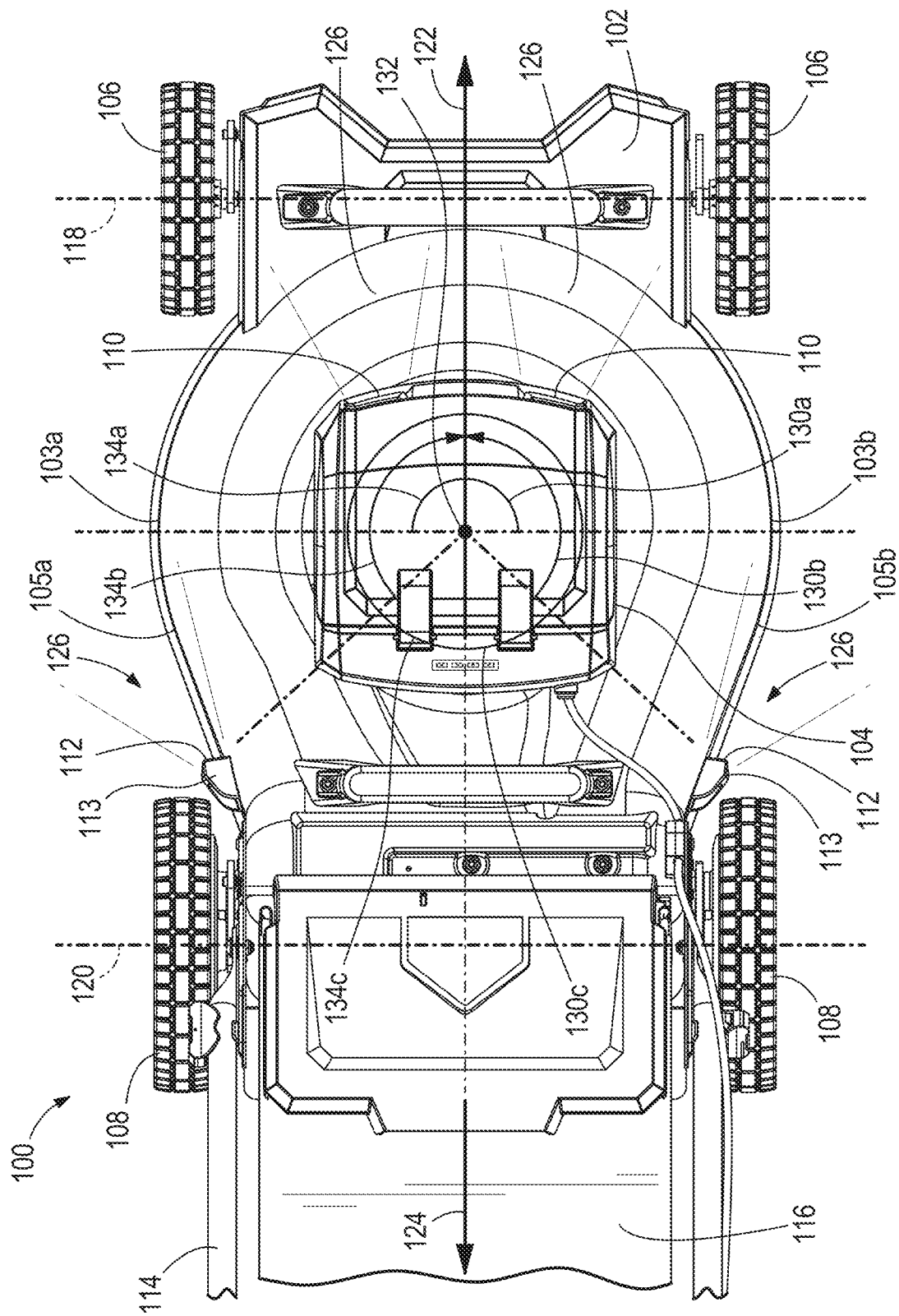
FIG. 4 is a detailed top plan view of the walk-behind mower of FIG. 1.

As shown in FIG. 3, the mower deck 102 could be configured to have at least one sidewall 103 having a curvature 105. As illustrated in FIG. 4, in some embodiments, the mower deck could be configured to have a left sidewall 103a and a right sidewall 103b, each having respective curvatures 105a and 105b. At least one light source 110, 112 could be coupled to the curvature 105, and in such a configuration, the at least one light source 110, 112 could project light 126 in a primary direction tangential to the curvature 105 of the sidewall. In some embodiments, the light sources 110, 112 may be connected by a common housing, but in other embodiments, the light sources 110, 112 may be contained in separate corresponding housings 113.

With continued reference to FIG. 3, the plurality of light sources 110, 112 are configured to project light 126 onto the support surface 128. The support surface 128 may be, for example, a lawn to be mowed. As shown in FIG. 4, the plurality of light sources 110, 112 illuminate a continuous portion of the support surface 128.

In the illustrated embodiment, the plurality of light sources 110, 112 illuminate a right-side continuous portion of the support surface 128 relative to the walk-behind mower 100 through a right-side illumination angle 130 about the walk-behind mower. More specifically, the right-side illumination angle 130 extends about the mower deck 102. The right-side illumination angle 130 is measured from the forward direction 122 toward the rearward direction 124. In the illustrated embodiment, the angle 130 is also measured about a vertical blade rotational axis 132 of a cutting blade (not shown), which is roughly aligned with the center of the head 104. Various embodiments of the walk-behind mower 100, depending on the shape of the light sources 110, 112, the angle of the light sources 110, 112, and other design factors, are capable of different right-side illumination angles 130. In one embodiment, the right-side illumination angle 130a is at least 90 degrees. In another embodiment, the right-side illumination angle 130b is at least 135 degrees. In yet another embodiment, the right-side illumination angle 130c is 180 degrees.

The illustrated embodiment further includes the plurality of light sources 110, 112 illuminating a left-side continuous portion of the support surface 128 relative to the walk-behind mower 100 through a left-side illumination angle 134 about the walk-behind mower. In the illustrated embodiment, the left-side illumination angle 134 is also measured from the forward direction 122 toward the rearward direction 124 and about the blade rotational axis 132. With a common axis about which the right-side illumination angle 130 and the left-side illumination angle 134 are measured, the two angles 130, 134 are continuous with each other to combine as a single continuous angle. If each of the right-side illumination angle 130a and the left-side illumination angle 134a is at least 90 degrees, then the single continuous angle is at least 180 degrees. If each of the right-side illumination angle 130b and the left-side illumination angle 134b is at least 135 degrees, then the single continuous angle is at least 270 degrees. If each of the right-side illumination angle 130c and the left-side illumination angle 134c is 180 degrees, then the single continuous angle is 360 degrees.

In other embodiments, however, the right-side illumination angle 130 and the left-side illumination angle 134 may not have a common axis and, therefore, may not cooperate to form a single continuous angle. In such embodiments, there may be a dark area immediately in front of the walk-behind mower 100. Further, it is noted herein that the right-side illumination angle 130 and the left-side illumination angle 134 need not be identical angular values.

Figure 5:
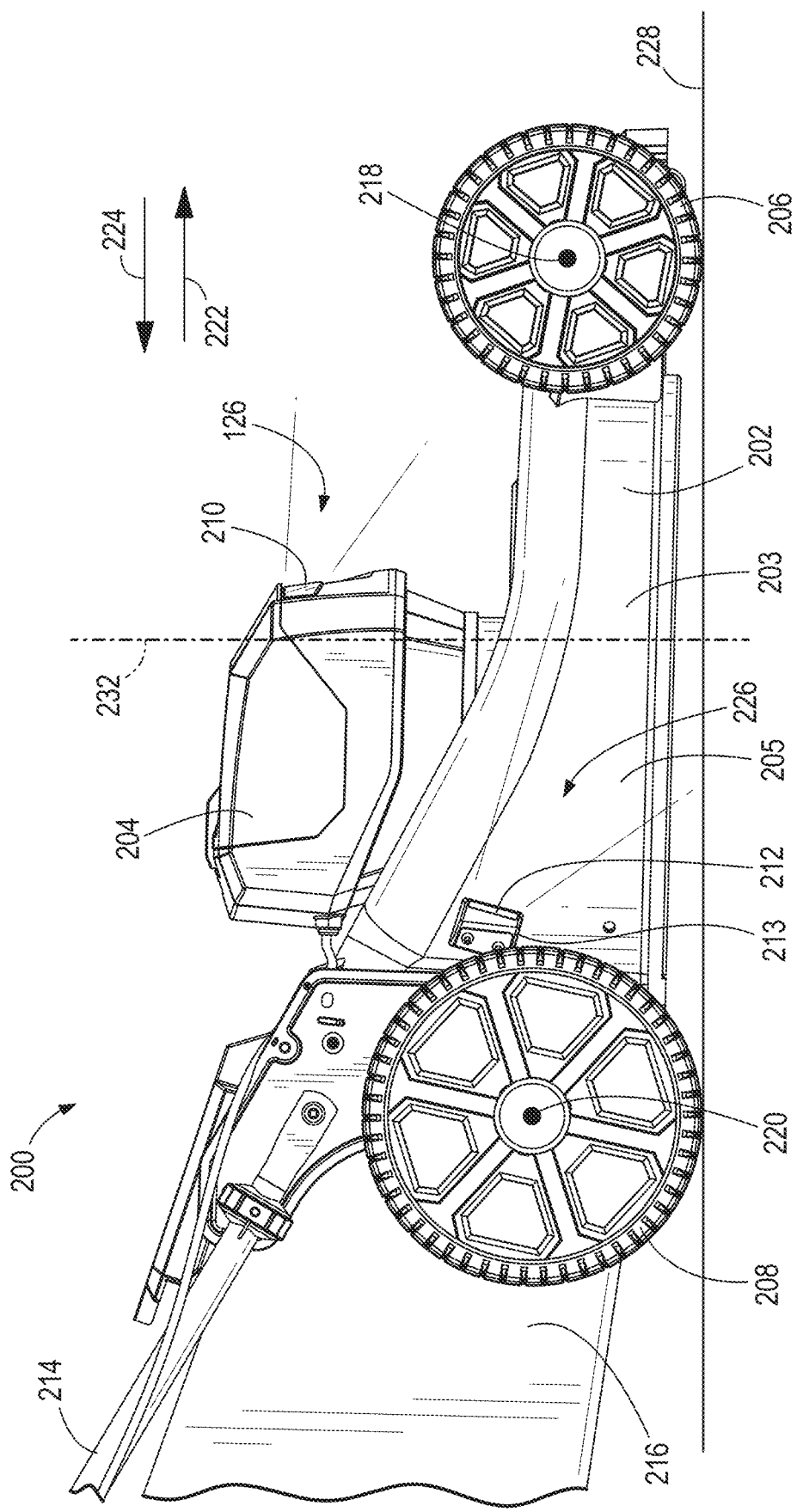
FIG. 5 is a detailed right-side elevation view of a walk-behind mower, according to embodiments disclosed herein.

FIG. 5 illustrates another embodiment of a walk-behind mower 200. This embodiment of the walk-behind mower 200 is similar in many ways to the walk-behind mower 100 of FIGS. 1-4 and, as such, will be illustrated with like reference numbers increased by a value of 100. For the sake of brevity, only the differences between the walk-behind mower 200 of FIG. 5 and the walk-behind mower 100 of FIGS. 1-4 will be discussed herein. The walk-behind mower 200 of FIG. 5 differs in structure only in that the head 204 is disposed farther rearward on the mower deck 202. In this embodiment, the cutting blade may be driven indirectly by the motor via a transmission, belt, or other linkage.

Figure 6:
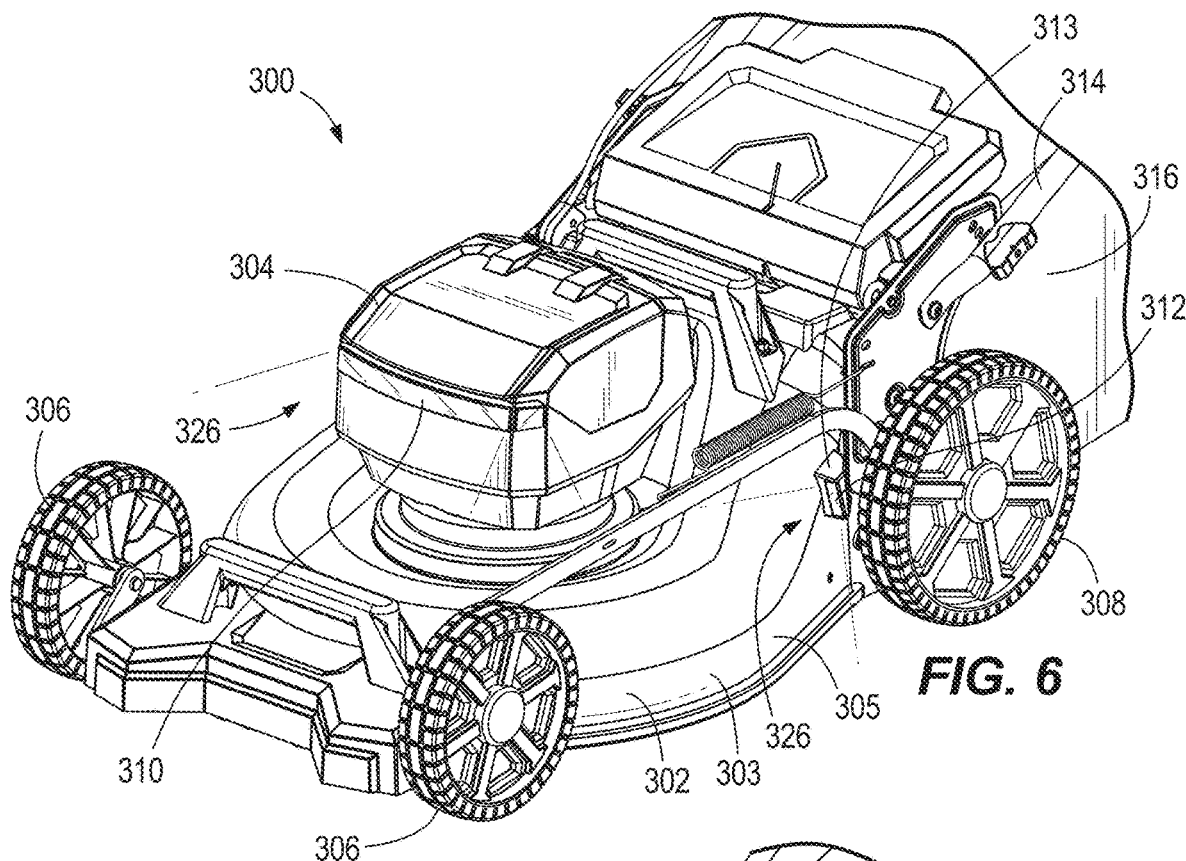
FIG. 6 is a detailed perspective view of a walk-behind mower, according to embodiments disclosed herein.

FIG. 6 illustrates still another embodiment of a walk-behind mower 300. This embodiment of the walk-behind mower 300 is similar in many ways to the walk-behind mower 100 of FIGS. 1-4 and, as such, will be illustrated with like reference numbers increased by a value of 200. For the sake of brevity, only the differences between the walk-behind mower 300 of FIG. 6 and the walk-behind mower 100 of FIGS. 1-4 will be discussed herein. The walk-behind mower 300 of FIG. 6 differs in structure only in that the head 304 includes a different shape and has different front light sources 310. In this illustrated embodiment, the front light sources 310 share a common lens, such that the plurality of LEDs behind the common lens should be considered the plurality of front light sources 310.

Figure 7:
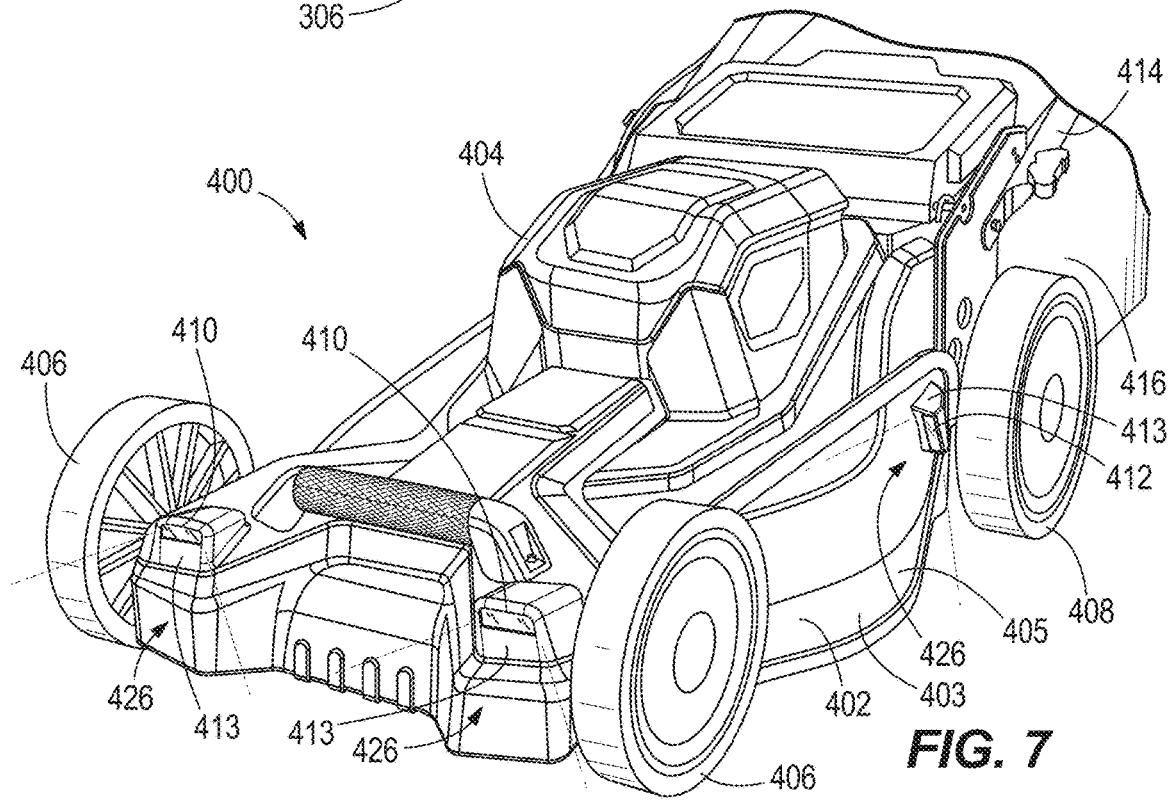
FIG. 7 is a detailed perspective view of a walk-behind mower, according to embodiments disclosed herein.
Figure 8:
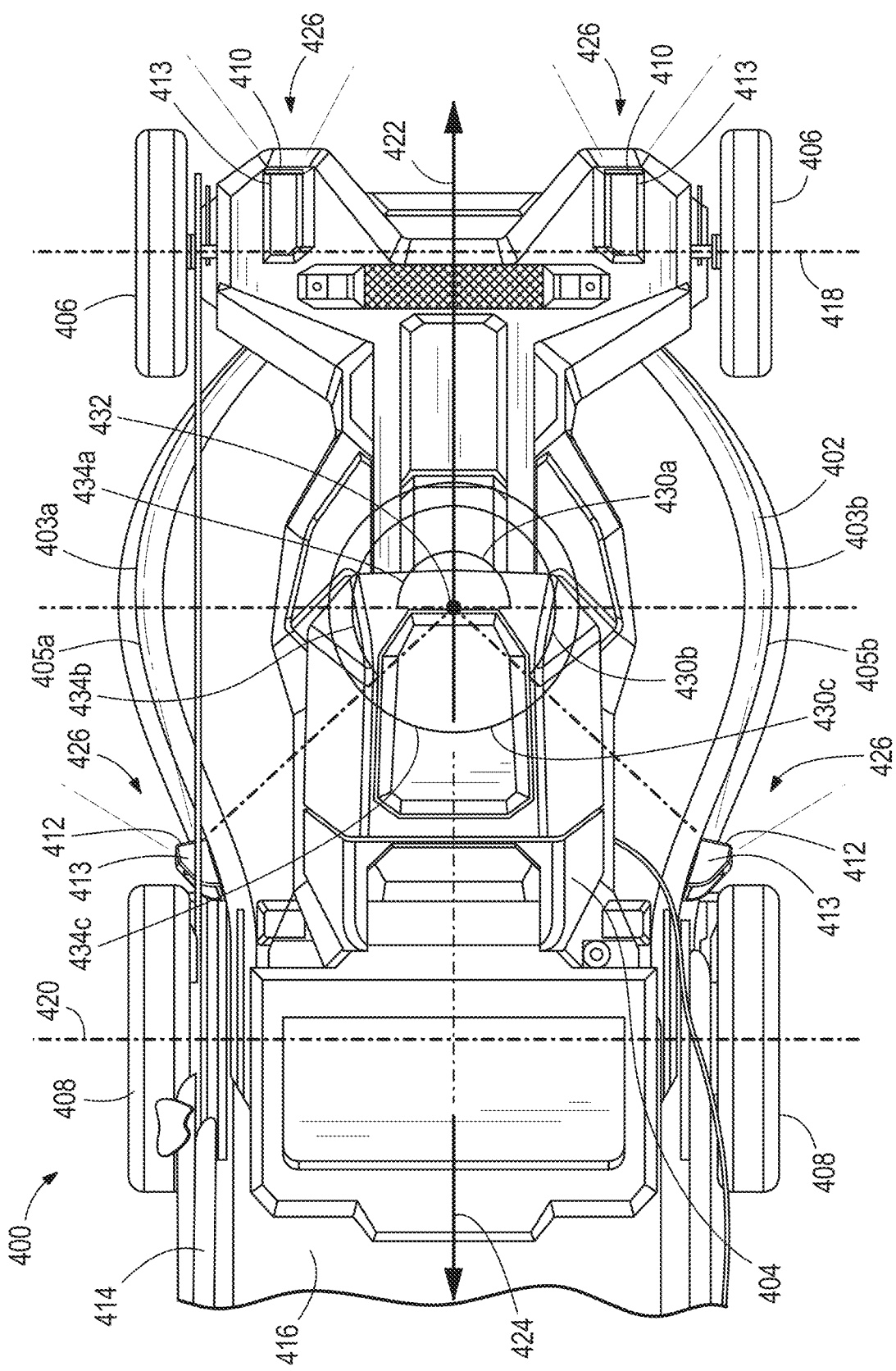
FIG. 8 is a detailed top plan view of the walk-behind mower of FIG. 7.

FIGS. 7 and 8 illustrate yet another embodiment of a walk-behind mower 400. This embodiment of the walk-behind mower 400 is similar in many ways to the walk-behind mower 100 of FIGS. 1-4 and, as such, will be illustrated with like reference numbers increased by a value of 300. For the sake of brevity, only the differences between the walk-behind mower 400 of FIGS. 7 and 8 and the walk-behind mower 100 of FIGS. 1-4 will be discussed herein. The walk-behind mower 400 of FIGS. 7 and 8 has a head 404 that is disposed farther rearward on the mower deck 402. In this embodiment, the cutting blade may be driven indirectly by the motor via a transmission, belt, or other linkage. The walk-behind mower 400 of FIGS. 7 and 8 also includes the front light sources 410 coupled to the mower deck 402 instead of the head 404. Further, in this embodiment, the front light sources 410 are positioned forward of the front rotational axis 418.

Figure 9:
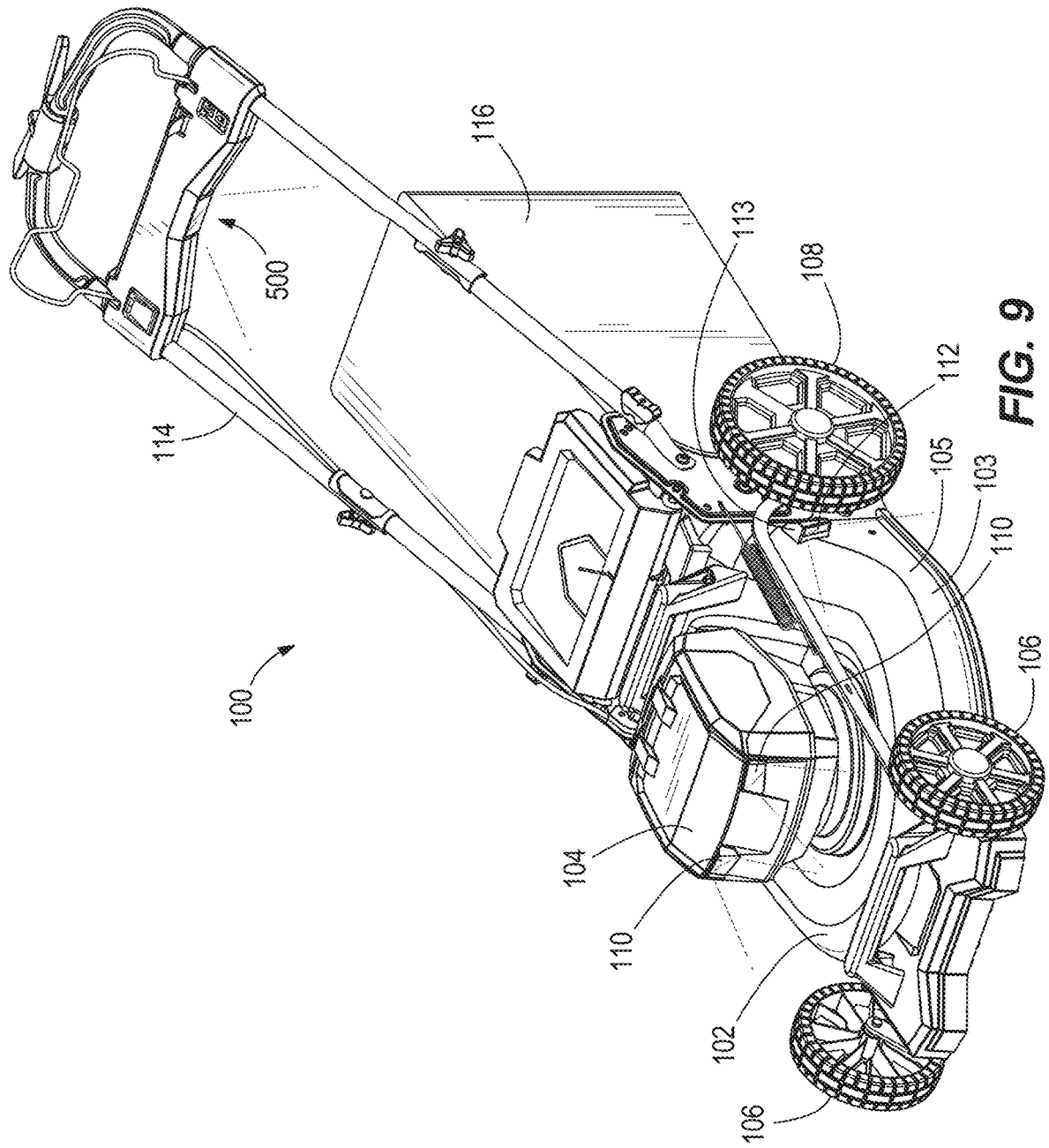
FIG. 9 is a perspective view of a walk-behind mower, according to embodiments disclosed herein.

Still other embodiments may provide one or more lights on other structures of the walk-behind mower, such as the control bar assembly. Such embodiments may be capable of more fully illuminating behind, for instance, the removable collection bag. In such embodiments, a light 500 (FIG. 9) in the upper portion of the control bar assembly may point downward toward the support surface behind the mower and/or a rear portion of the mower in order to provide a user better visibility during the installation or removal of attachments (such as a rear-side discharge structure, a removable collection bag, a mulching plug, or the like) and to monitor the condition of the attachments during use of the mower.

Figure 10:
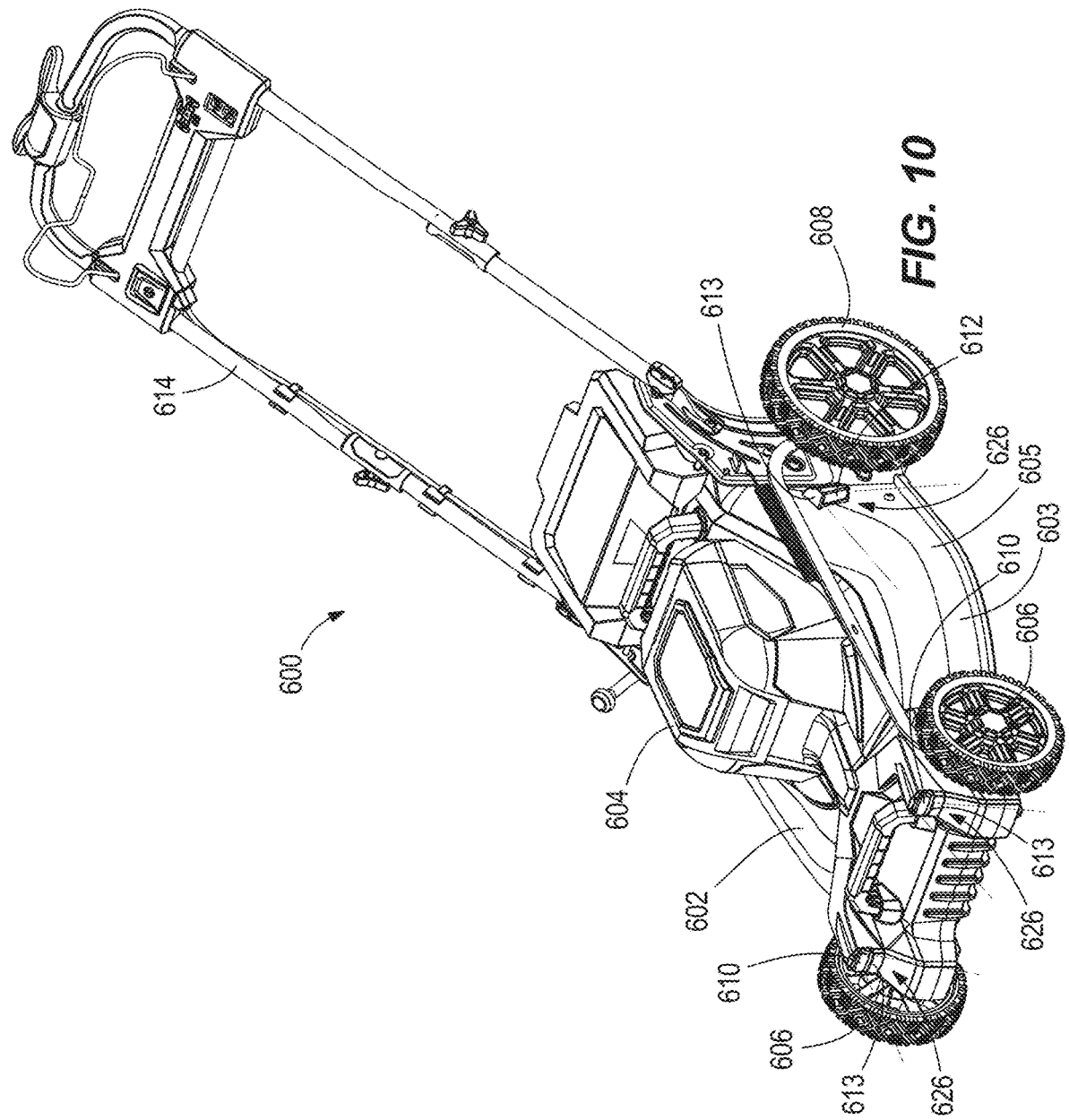
FIG. 10 is a perspective view of a walk-behind mower, according to embodiments disclosed herein.
Figure 11:
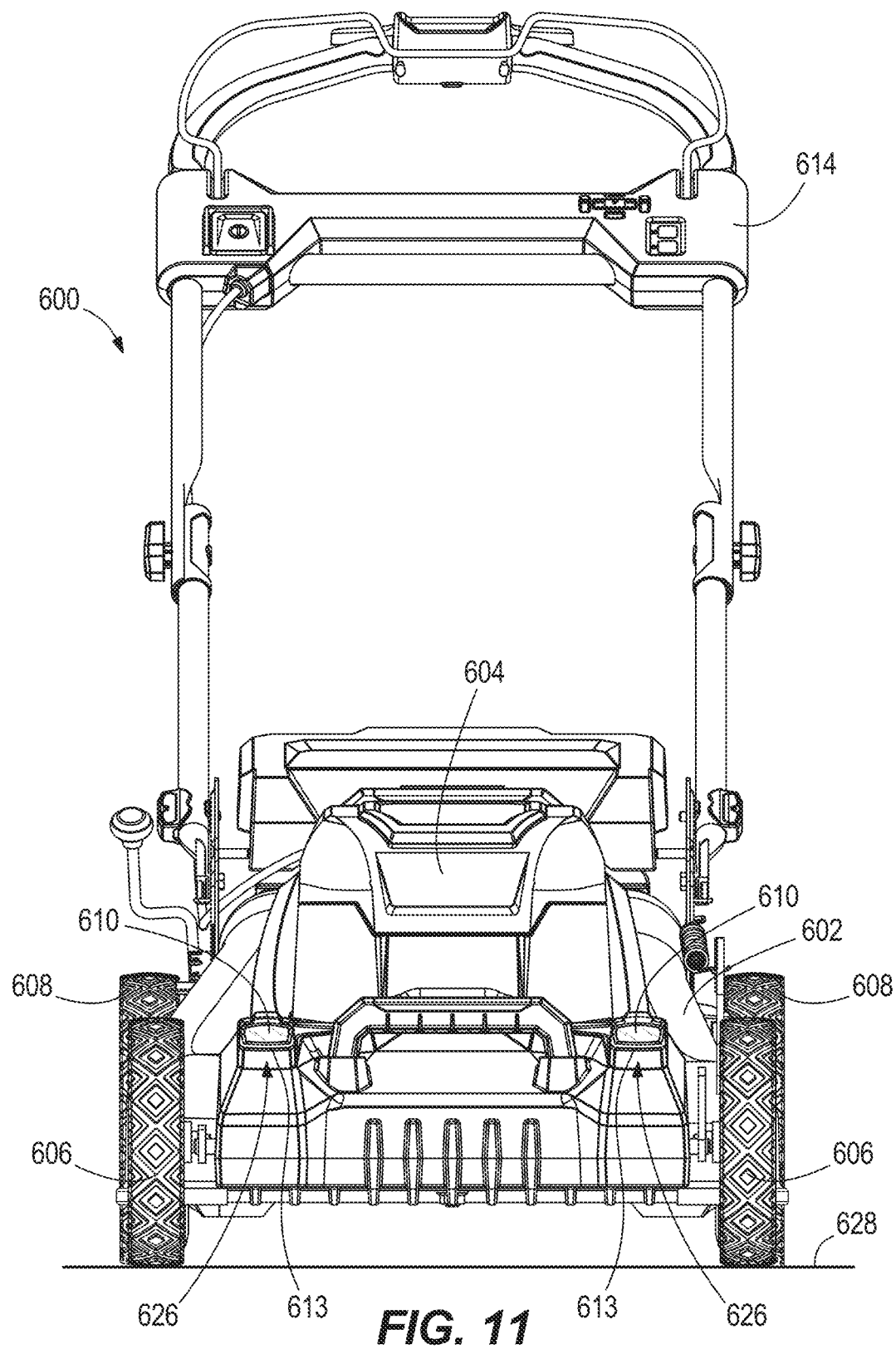
FIG. 11 is a front elevation view of the walk-behind mower of FIG. 10.
Figure 12:
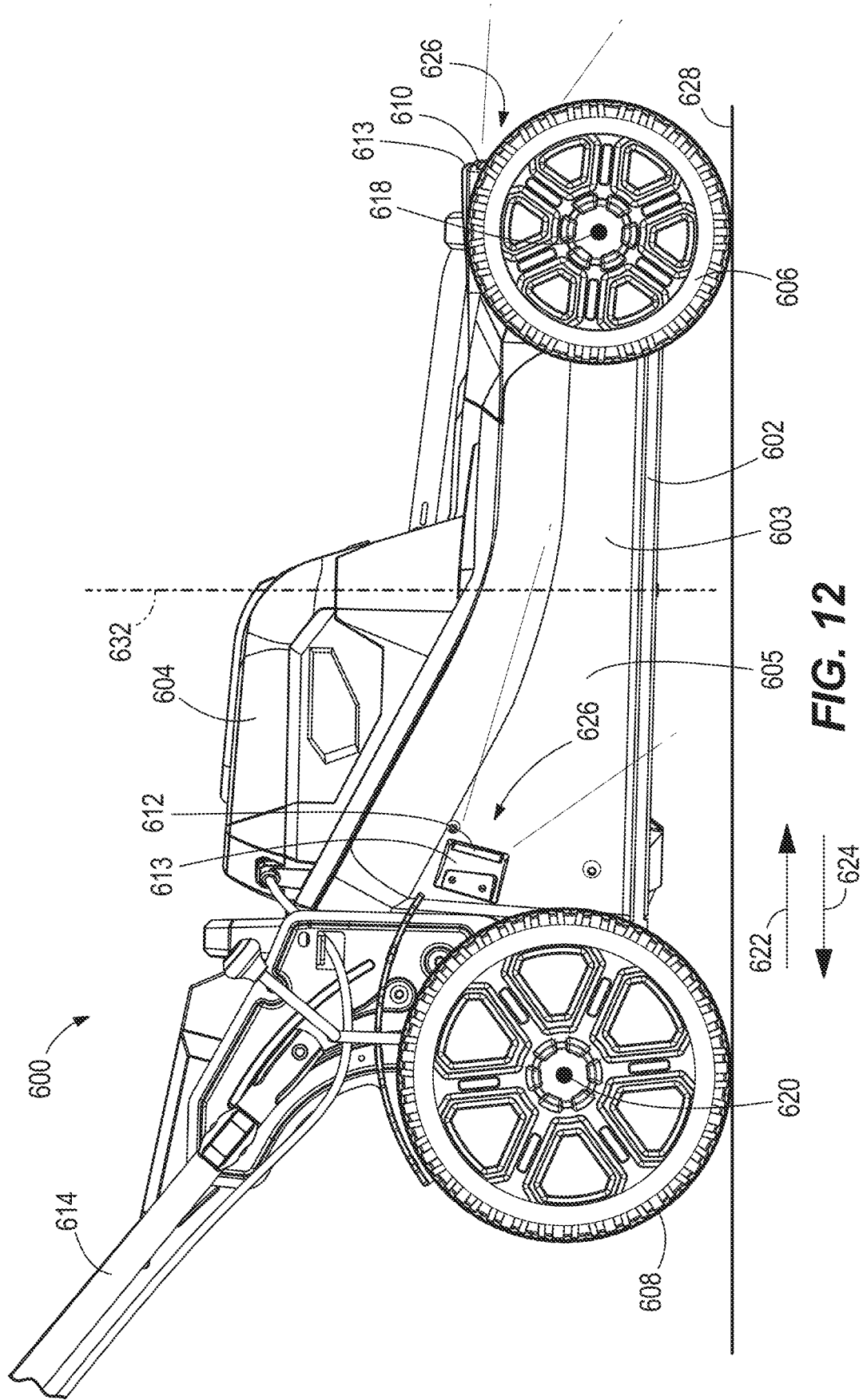
FIG. 12 is a detailed right-side elevation view of the walk-behind mower of FIG. 10.
Figure 13:
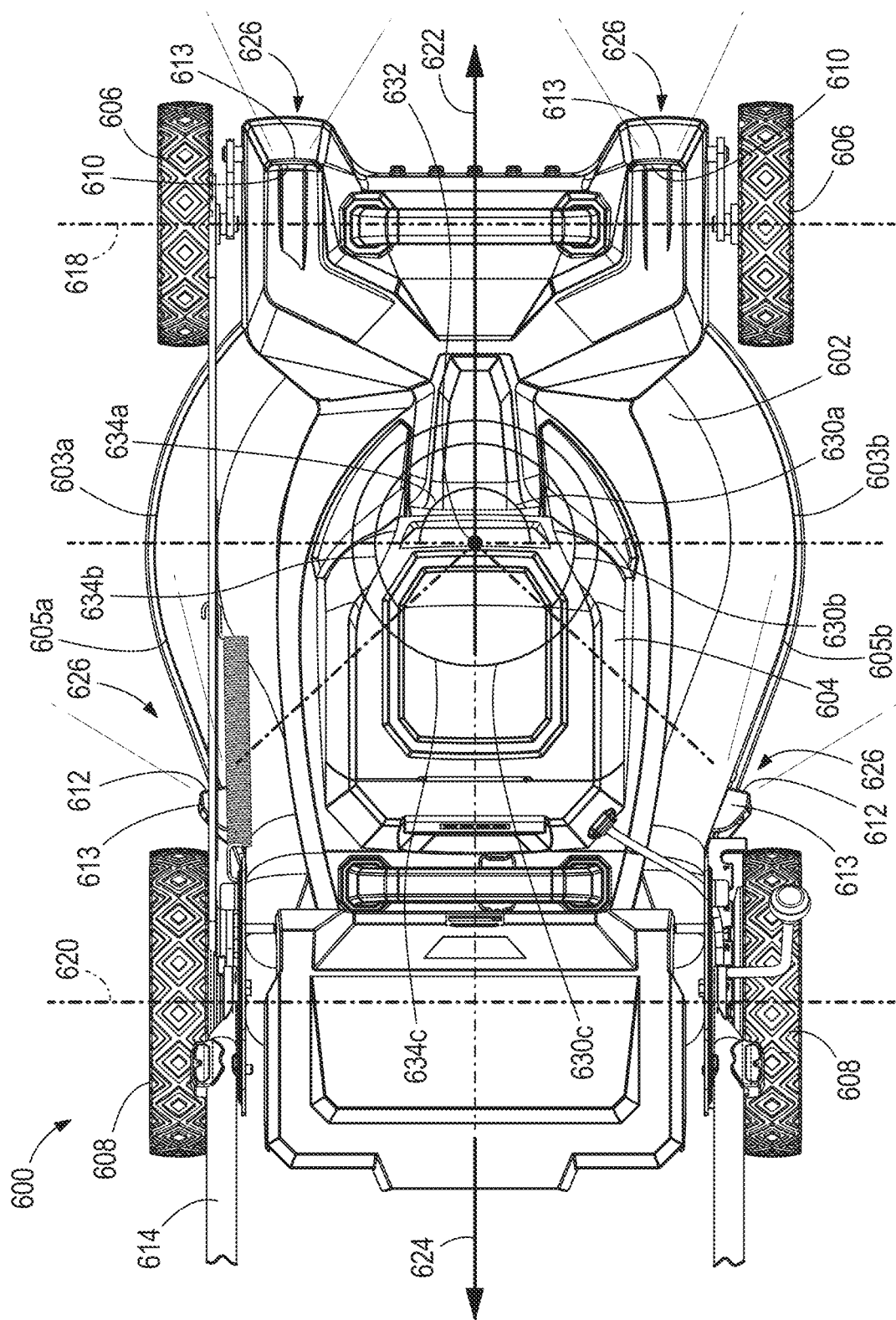
FIG. 13 is a detailed top plan view of the walk-behind mower of FIG. 10.

FIG. 10 illustrates yet another embodiment of a walk-behind mower 600. This embodiment of the walk-behind mower 600 is similar in many ways to the walk-behind mower 400 of FIG. 7 and, as such, will be illustrated with like reference numbers increased by a value of 200. For the sake of brevity, only some of the differences between the walk-behind mower 600 of FIG. 10 and the walk-behind mower 400 of FIG. 7 will be discussed herein.

Figure 14:
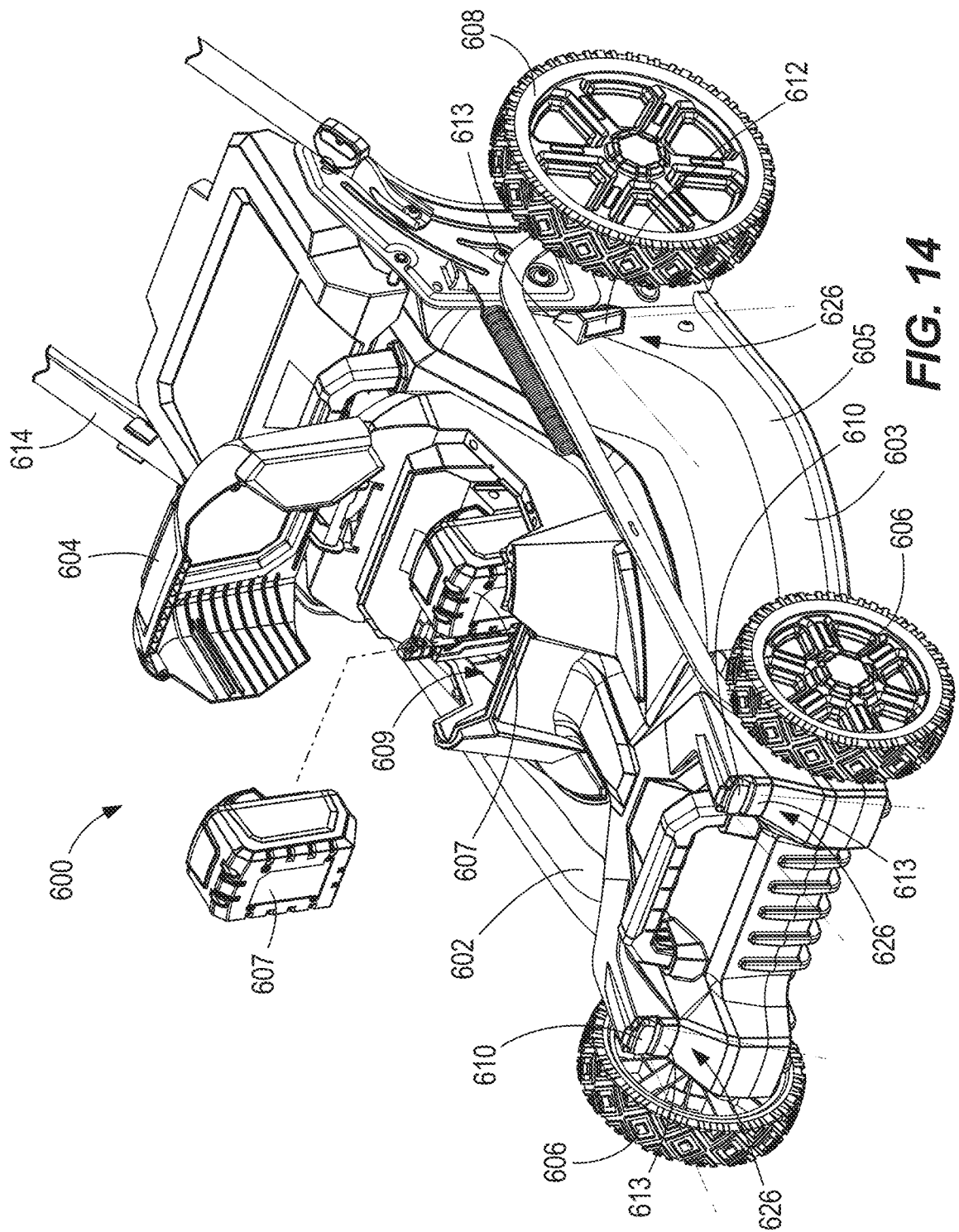
FIG. 14 is partially-exploded detailed perspective view of the walk-behind mower of FIG. 10.
Figure 15:
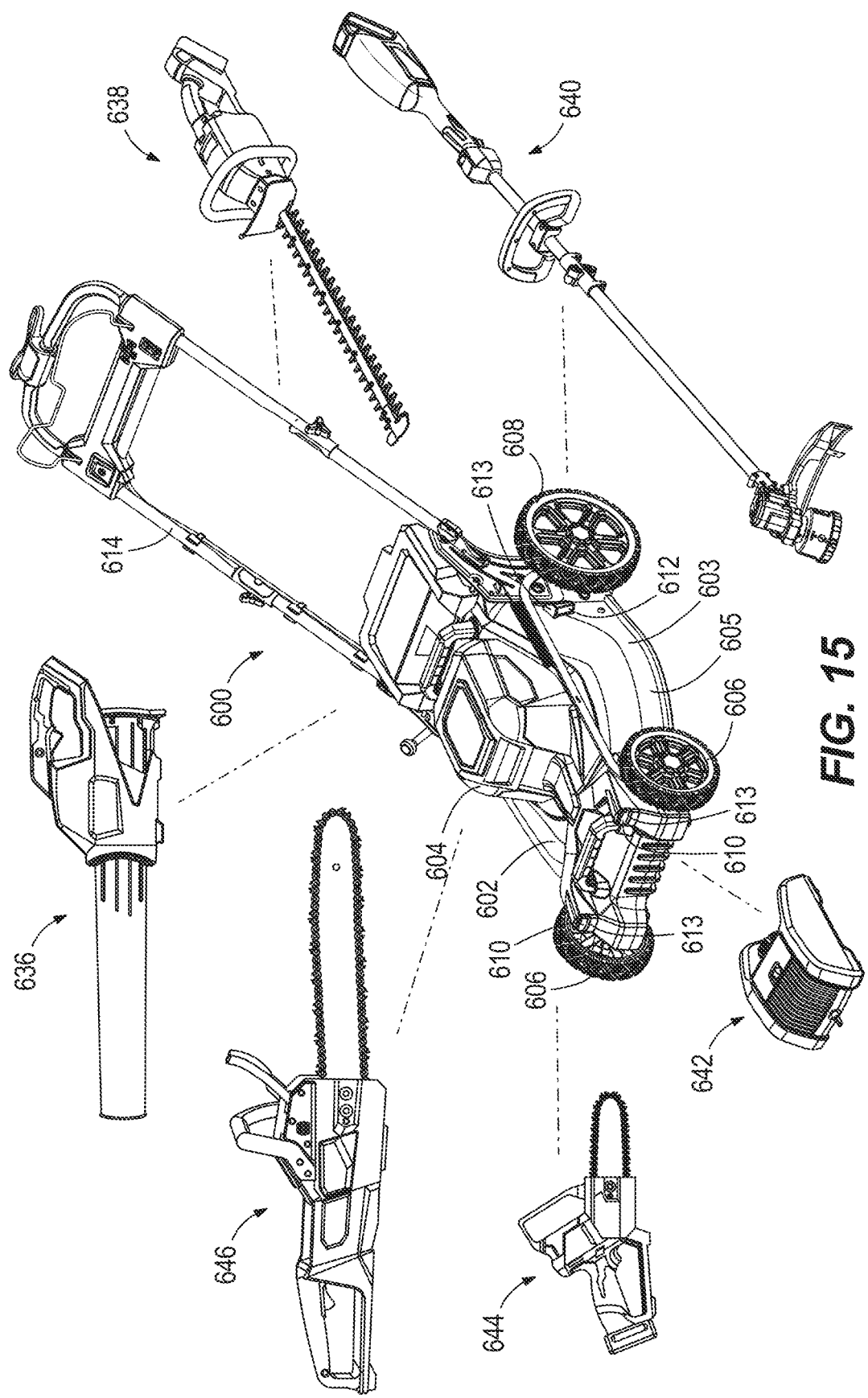
FIG. 15 is a perspective view of the walk-behind mower of FIG. 10 along with other devices that may also be powered by one or more of the same batteries that power the walk-behind mower of FIG. 10.

While not illustrated in the prior embodiments, the walk-behind mower 600, as well as the prior embodiments, may be powered by a battery pack 607 as shown in FIG. 14. The battery pack 607 may also be used to power other power tools, such as those shown in FIG. 15. These power tools may include, for instance, a blower 636, a hedge trimmer 638, a string trimmer 640, a pruning chainsaw 644, and a chainsaw 646. The battery pack 607 may be a rechargeable battery pack that is rechargeable by a battery charger 642, for instance, and/or may be removably received by the head 104 to facilitate charging in a remote charging station or replacing the battery pack 607. Stated another way, the head 104 may define a battery recess (such as the battery recess 609 of FIG. 14) configured to removably store at least one rechargeable battery pack. As shown in FIGS. 14 and 15, the battery pack 607, in some embodiments, is a typical portable power tool battery pack that is made to be used interchangeably with various power tools including, but not limited to, drills, saws 646, 644; blowers 636, mowers 600, hedge trimmers 638, string trimmers 640, lights, and the like.

Still other non-illustrated embodiments are contemplated herein. For instance, a head and/or mower deck with a ring of spaced apart light sources could provide illumination of the support surface throughout the angles described above. Other embodiments may include a single continuous ring-shaped lens or light strip that appears as a halo having multiple light sources in the form of LEDs behind the single lens or continuous strip.

All of the light sources may be turned on or off with controls located on, for instance, the control bar assembly. Some or all of the lights may be dimmable. Some of the lights may remain illuminated while others may be toggled on or off depending on the need of the user or depending on ambient light conditions sensed by one or more optical sensors.

Various features of the disclosure are set forth in the following claims.

What is claimed is:

1. A walk-behind mower comprising:
   a mower deck;
   a plurality of wheels rotatably coupled to the mower deck, the plurality of wheels configured to move the walk-behind mower over a support surface in a forward direction and a rearward direction, the plurality of wheels including at least one front wheel and at least one rear wheel, the front wheel spaced apart from the rear wheel in the forward direction, the front wheel having a front rotational axis and the rear wheel having a rear rotational axis, the front rotational axis extending parallel with the rear rotational axis;
   a head coupled to the mower deck, the head configured to store at least one battery pack; and
   a plurality of light sources coupled to at least one of the mower deck and the head, the plurality of light sources including a front light source closer to the front rotational axis than to the rear rotational axis and a rear light source coupled to the mower deck closer to the rear rotational axis than to the front rotational axis.

2. The walk-behind mower of claim 1, wherein the front light source is disposed forward of the front rotational axis and the rear light source is disposed forward of the rear rotational axis.

3. A walk-behind mower comprising:
   a mower deck;
   a plurality of wheels rotatably coupled to the mower deck, the plurality of wheels configured to move the walk-behind mower over a support surface in a forward direction and a rearward direction;
   a head coupled to the mower deck, the head configured to store at least one battery pack; and
   a plurality of light sources, at least one of the plurality of light sources disposed rearward of the head, the plurality of light sources configured to project light through a continuous illumination angle about the walk-behind mower, the illumination angle extending along an arc from the forward direction toward the rearward direction, the illumination angle being at least 90 degrees.

4. The walk-behind mower of claim 3, wherein the plurality of light sources includes a plurality of light-emitting diodes.

5. The walk-behind mower of claim 3, wherein the at least one battery pack is a portable power tool battery pack for use with a variety of power tools.

6. The walk-behind mower of claim 3, wherein the at least one of the plurality of light sources is mounted to the mower deck.

7. The walk-behind mower of claim 6, wherein the at least one of the plurality of light sources is coupled to a curvature of a sidewall of the mower deck.

8. The walk-behind mower of claim 3, wherein the plurality of wheels includes at least one front wheel and at least one rear wheel, the front wheel spaced apart from the rear wheel in the forward direction, the front wheel having a front rotational axis and the rear wheel having a rear rotational axis, the front rotational axis extending parallel with the rear rotational axis.

9. The walk-behind mower of claim 8, wherein the plurality of light sources includes a front light source coupled to the mower deck closer to the front rotational axis than to the rear rotational axis and a rear light source coupled to the mower deck closer to the rear rotational axis than to the front rotational axis.

10. The walk-behind mower of claim 9, wherein the front light source is disposed forward of the front rotational axis and the rear light source is disposed forward of the rear rotational axis.

11. The walk-behind mower of claim 3, wherein the illumination angle is a right-side illumination angle, and the plurality of light sources is further configured to illuminate another continuous portion of the support surface through a left-side illumination angle about the walk-behind mower, the left-side illumination angle also extending from the forward direction toward the rearward direction, the left-side illumination angle being at least 90 degrees.

12. The walk-behind mower of claim 11, wherein each of the right-side illumination angle and the left-side illumination angle is at least 135 degrees.

13. The walk-behind mower of claim 12, wherein each of the right-side illumination angle and the left-side illumination angle is 180 degrees.

14. The walk-behind mower of claim 11, wherein the right-side illumination angle is continuous with the left-side illumination angle.

15. The walk behind mower of claim 3, wherein at least one of the plurality of light sources is coupled to the head.

16. A walk-behind mower comprising:
    a mower deck;
    a plurality of wheels rotatably coupled to the mower deck, the plurality of wheels including a pair of front wheels rotatable about a front axis and a pair of rear wheels rotatable about a rear axis, the rear axis disposed rearward relative the front axis;
    a handle disposed rearward relative the rear axis; and
    a plurality of light sources disposed forward relative the rear axis, the light sources disposed such that each respective wheel of the plurality of wheels has a corresponding light source nearer to the respective wheel than to any other wheel of the plurality of wheels, the plurality of light sources including a rear light source, the rear light source disposed at least partially between the mower deck and the respective rear wheel to which the rear light source is nearest.

17. The walk-behind mower of claim 16, wherein the plurality of wheels includes four wheels and the plurality of light sources includes four discrete light-emitting diode light sources.

18. The walk-behind mower of claim 17, wherein each discrete light-emitting diode light source includes more than one light-emitting diode.

19. The walk-behind mower of claim 16, wherein each light source of the plurality of light sources includes a separate corresponding housing.

20. The walk-behind mower of claim 16, wherein at least one of the plurality of light sources is incorporated into the mower deck.

* * * * *